Sept. 11, 1956  E. J. DUNHAM ET AL  2,762,443
AXLE HOUSING AND MAIN FRAME ASSEMBLY FOR LIFT TRUCKS
Filed Dec. 2, 1954  3 Sheets-Sheet 1

*INVENTORS.*
ELMER J. DUNHAM
ALFRED WAYNE GUNNING
BY

ATTY.

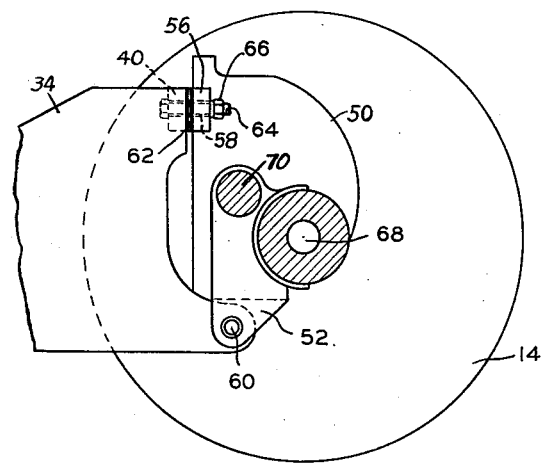
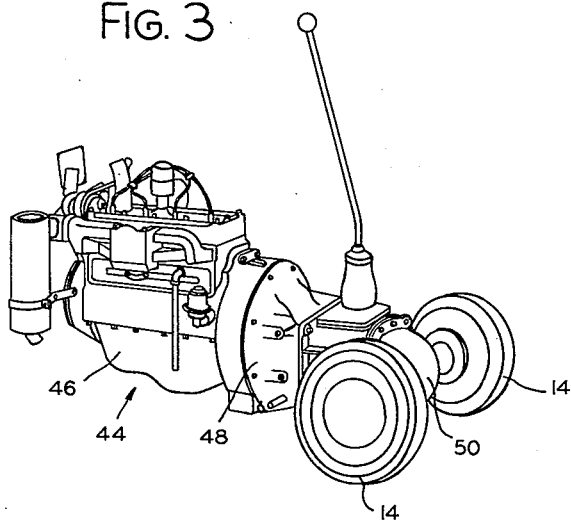

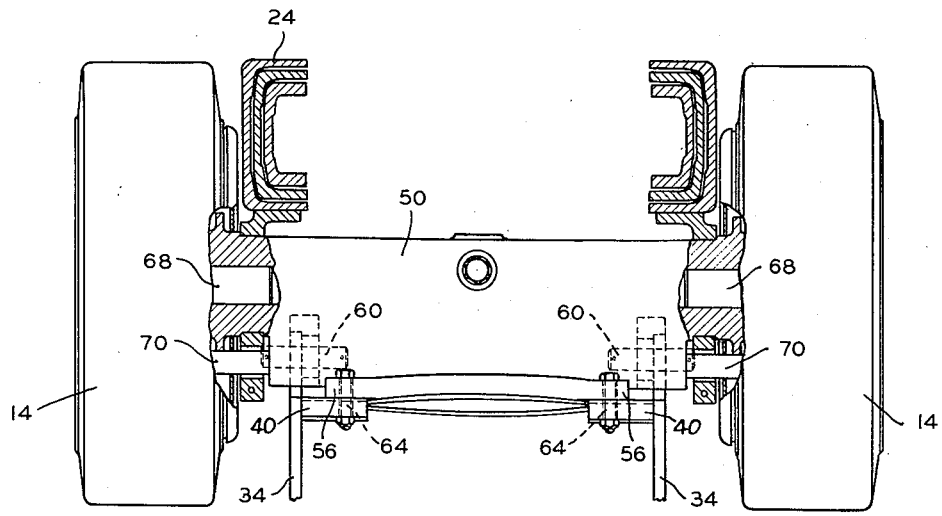
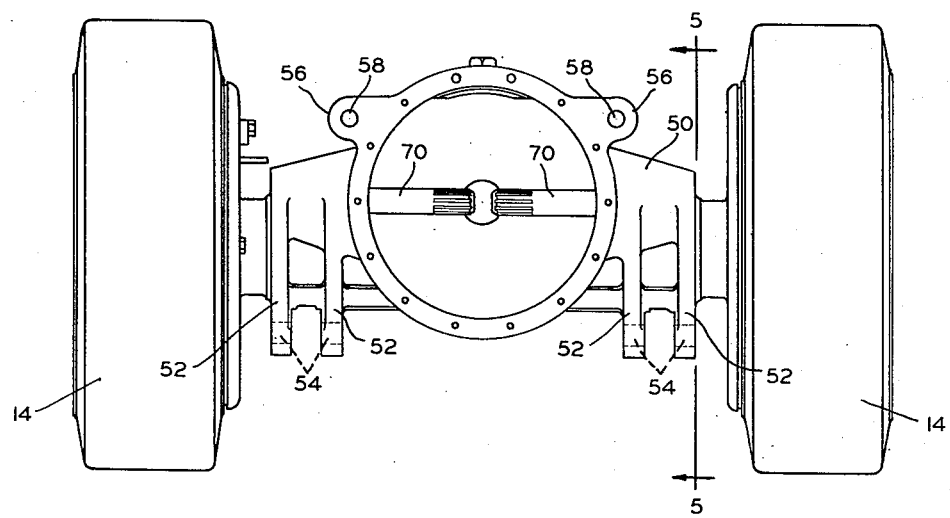

United States Patent Office 2,762,443
Patented Sept. 11, 1956

2,762,443

AXLE HOUSING AND MAIN FRAME ASSEMBLY FOR LIFT TRUCKS

Elmer J. Dunham and Alfred Wayne Gunning, Battle Creek, Mich., assignors to Clark Equipment Company, a corporation of Michigan Application December 2, 1954, Serial No. 472,735

3 Claims. (Cl. 180—11)

Our present invention relates generally to an axle mounting for a vehicle, and, more specifically, is concerned with means for securing an axle housing to the main frame of a vehicle, such as an industrial fork lift truck.

Heretofore, considerable trouble has been encountered during the mounting of an axle housing to a vehicle frame. In one application, for example, the axle housing is secured solely by bolts to the vehicle frame. This arrangement is unsatisfactory, first, because it is difficult to align the parts that are to be bolted together, due to manufacturing variances, and second, because the bolts have a tendency to become loose during operation of the vehicle. When the bolts become loose, the bolted parts frequently slip into misalignment and are subject to fracture.

In another application, the arms of the axle housing are mounted in trunnions carried by the vehicle frame. This type of axle mounting has not proved completely successful due to the accurate machining of the parts that is required, and the difficulty in aligning the parts and maintaining them tight. Moreover, special provision must be made for absorbing the torque and brake reaction associated with the axle assembly during operation of the vehicle.

It is an object of our present invention to provide means whereby an axle housing may be easily and inexpensively secured to a vehicle frame irrespective of manufacturing variances that may exist between the parts to be interchangeably assembled.

To accomplish this object, we provide means whereby the axle housing may be pivoted from its normal operating position, pivotally mounted to the vehicle frame about an axis extending transversely of the vehicle, pivoted about the pivotal mounting back to its normal operating position and bolted to the frame. The initial pivotal mounting of the axle housing to the vehicle frame facilitates alignment of these two vehicle structures and simplifies the subsequent bolting of the components together.

Now in order to acquaint those skilled in the art with the manner of constructing and using axle mounting means in accordance with the principles of our present invention, we shall describe in connection with the accompanying drawings a preferred embodiment of our invention.

In the drawings:

Figure 3 is a perspective view of the rigid power unit of the vehicle shown in Figure 1;

Figure 4 is a side elevational view of the axle housing of the rigid power unit shown in Figure 3;

Figure 5 is an elevational view taken substantially along the line 5—5 in Figure 4, looking in the direction indicated by the arrows, and shows portions of the axle housing in section; and Figure 6 is a partial plan view taken substantially along the line 6—6 in Figure 1, looking in the direction indicated by the arrows, with portions being broken away and shown in section.

Figure 1:
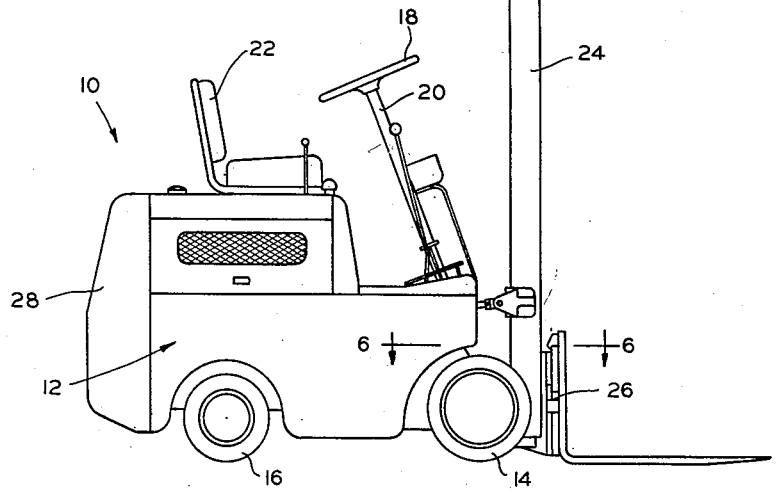
Figure 1 is a side elevational view of an industrial truck with which the axle mounting means of our present invention is embodied.

Although our present invention is adaptable for use with commercial vehicles of various types, for purposes of illustration, we shall describe our invention as it may be embodied in an industrial fork lift truck such as is shown in Figure 1. The vehicle 10 comprises a main frame 12 that is supported at its forward end on drive wheels 14 and at its rear end on steering wheels 16. The steering wheels 16 are controlled by an operator's steering wheel 18 arranged at the upper end of a steering column 20 adjacent an operator's seat 22. Supported at the forward end of the truck frame 12 is a generally vertically extending tiltable mast or upright assembly 24, in which a load supporting carriage assembly 26 is upwardly and downwardly movable, and supported at the rear end of the truck frame 12 is a counterweight 28.

Figure 2:
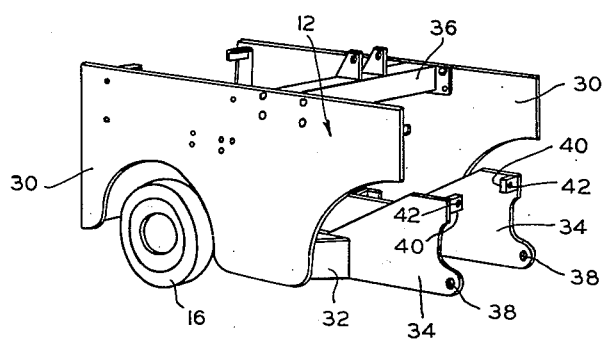
Figure 2 is a perspective view of the frame of the vehicle shown in Figure 1.

The truck frame 12 includes, as shown in Figure 2, a pair of laterally spaced, lengthwise extending, vertical side members 30. Lateral supports 32 extend inwardly of the side members 30, at the forward ends thereof, and provide support for a pair of laterally spaced, lengthwise extending, vertical plate members 34. The side members 30 and the plate members 34 are maintained in proper spaced relation by means of transverse brace members, one of which is shown at 36. The plate members 34 may be cast or cut in the approximate configuration shown in Figure 2.

Each of the plate members 34 has an opening 38 formed therein at the lower forward end. The openings 38 are aligned on an axis extending transversely of the truck frame 12. Each plate member 34 is further provided with a laterally inwardly extending vertical pad 40, which is secured in position, for example, by welding. The vertical pads 40 are above the plate openings 38 preferably rearwardly of a vertical plane passing through the axis of the latter, and have openings 42 formed therein on axes which extend lengthwise of the truck 10.

The above described truck frame 12 is adapted to receive between the side members 30 a power unit 44 such as is shown in Figure 3. The power unit comprises a prime mover housing 46, a transmission housing 48 and a drive axle housing 50 coupled together as a rigid unit. The drive wheels 14 are mounted adjacent the ends of the axle housing 50 and suitable prime mover and power transmission means are incorporated with the housings 46, 48 and 50.

The drive axle housing 50 of the power unit 44, as shown in Figure 4, is provided with pairs of downwardly depending, axially spaced, yoke members 52 which may be formed integrally therewith, as shown in Figure 4, or formed separately and suitably attached thereto as will be understood by those skilled in the art. Each yoke member 52 has an opening 54 formed therein, and the several openings 54 are aligned on an axis extending lengthwise of the drive axle housing 50. At a level above the yoke members 52, provision is made for laterally extending bosses 56 which, like the yoke members 52, may be formed integrally with the drive axle housing 50 or formed separately and secured thereto. Each boss 56 has an opening 58 extending transversely of the axle housing.

Specifically, during the mounting operation, the power unit is tilted approximately 30 to 40 degrees from its normal horizontal position and then it is moved between the side members 30. After the plate members 34 have been disposed between the adjacent pairs of yoke members 52, and the yoke openings 54 have been aligned with the plate openings 38, pin members 60 are inserted in the aligned openings and are held in position by cotter pins, or the like.

Upon completion of the fitting of the pin members 60, the power unit 44 is tilted about these pin members back to its normal horizontal position whereat the prime mover end of the power unit is permitted to rest on mountings (not shown) carried by the truck frame 12. With the power unit 44 in the position described, no stress exists between the prime mover, transmission means and the drive axle, and the axle housing bosses 56 substantially meet the plate pads 40.

The clearances between the bosses 56 and the pads 40 are filled with suitable shim or wedge means 62. The clearances are of the order of one-eighth of an inch and may be different at each axle housing boss 56. The shim means 62 in filling these clearances serve to compensate for manufacturing variances that may exist in both the axle housing 50 and the vehicle frame 12. This arrangement reduces the accuracy with which these parts must be fabricated and hence reduces their cost of manufacture, inspection and assembly. It is to be further noted that the shim means 62 are added at the upper portion of the axle housing 50 so that access may be conveniently had to the shims for adjustment or replacement.

To complete assembly, bolts 64 are inserted through the aligned plate pad openings 42, the axle housing boss openings 58, and the shim means 62 therebetween. Nuts 66 are threaded onto the bolts 64 and these bolt assemblies, together with the pin members 60, serve to secure the power unit 44 to the vehicle frame 12. The axle housing bosses 56 and the plate pads 40, when secured together, serve to receive the torque and brake reaction associated with the axle assembly during operation of the vehicle. It is to be further noted that the pivotal mounting of the axle housing to the vehicle frame serves to prevent misalignment of the latter vehicle components should the bolts 64 become loose.

Separation of the power unit 44 from the vehicle frame 12 may be easily accomplished by removing the bolts 64, tilting the prime mover end of the power unit away from its mountings, removing the pins 60 and withdrawing the power unit from between the side members 30. Thus, the power unit 44 may be easily removed for servicing or another power unit may be conveniently substituted for the unit 44 if, for example, the latter is either defective or of an unsatisfactory power rating for a particular job.

Referring now to Figure 6, the wheels 14, which are journaled on stub shafts 68 extending from the ends of the axle housing 50, are turned by spur pinions driving internal gears on the inner periphery of the wheels. The pinions, in turn, are rotated by drive shafts 70 extending from the drive axle differential. The described internal wheel drive means is fully disclosed in Patent No. 2,134,687 granted to Elmer J. Dunham, on November 1, 1938. Also, as shown in Figure 6, the lower end of the uprights 24 may be journaled directly on the axle housing 50 for tilting movement.

From the foregoing description, it will be realized that we have provided unique mounting means which facilitates alignment of the axle housing with the vehicle frame during assembly, and which simplifies the bolting of the components together. Moreover, since the assembly of the pin members and the bolt members may be accomplished by unskilled workmen, and since the several cooperating mounting elements may be fabricated from relatively simple parts, the cost of employing the mounting means of our present invention is maintained at a minimum. In addition, the mounting means of our present invention, although being particularly adaptable for use with a vehicle and a rigid power unit therefor, is applicable to various types of commercial vehicles, and may be embodied either with vehicles being manufactured or with existing vehicles.

Now while we have shown and described what we consider to be a preferred embodiment of our present invention, it will be understood by those skilled in the art that various rearrangements and modifications may be made therein, without departing from the spirit and scope of our invention.

We claim:

1. In a vehicle having laterally spaced lengthwise extending vertical frame means, a power unit comprising a prime mover housing, a transmission housing and a drive axle housing coupled together as a rigid unit adapted to be disposed to lie normally horizontally between said vertical frame means and with the axle housing extending transversely of said vehicle frame means adjacent one end thereof, cooperating pivotal mounting means between said axle housing and said frame means, said power unit being tiltable from its normal horizontal position to align said cooperating pivotal mounting means, pivot means for connecting said cooperating pivoted mounting means in said aligned position thereof, said power unit being tiltable about said pivot means to its normal horizontal position, connecting elements associated with said vertical frame means and said axle housing spaced from said pivotal mounting means, and connecting means for connecting said connecting elements to each other upon tilting of said power unit about said pivot means to a position disposing said connecting elements in alignment with each other, and said cooperating pivotal mounting means, said pivot means, said connecting elements, and said connecting means serving to secure said power unit to said frame means.

2. In a vehicle having a frame including a pair of laterally spaced lengthwise extending vertical plate means, a power unit comprising a prime mover housing, a transmission housing, and a drive axle housing coupled together as a rigid unit adapted to be disposed to lie normally horizontally between said vertical plate means and with the axle housing extending transversely of one end of said frame, said axle housing having downwardly depending axially spaced yoke members receiving therebetween portions of said plate means at said one end of said frame, pin members inserted through said yoke members and said plate members, a pair of laterally extending bosses carried by said axle housing above said yoke members, laterally inwardly extending vertical pad members for said plate means at said one end thereof and disposed above said yoke members, bosses carried by said axle housing disposed to align with said pad members, bolt means inserted through said bosses and said pad members, and said pin members and said bolt means serving to secure said axle housing to said vehicle frame.

3. The combination according to claim 1, further provided with adjustment means disposed between said connecting elements for affording horizontal alignment of said power unit between said vertical frame means.

References Cited in the file of this patent

UNITED STATES PATENTS

| 596,280 | Short | Dec. 28, 1897 |
| 2,037,961 | Boden | Apr. 21, 1936 |
| 2,216,697 | Vossenberg | Oct. 1, 1940 |
| 2,693,982 | Barenyi | Nov. 9, 1954 |